US009323536B2

(12) United States Patent
Demongeot et al.

(10) Patent No.: US 9,323,536 B2
(45) Date of Patent: Apr. 26, 2016

(54) IDENTIFICATION OF MISSING CALL AND RETURN INSTRUCTIONS FOR MANAGEMENT OF A RETURN ADDRESS STACK

(71) Applicant: ARM LIMITED, Cambridge (GB)

(72) Inventors: Clement Marc Demongeot, Antibes (FR); Louis-Marie Vincent Mouton, Vallauris (FR); Jocelyn Francois Orion Jaubert, Antibes (FR)

(73) Assignee: ARM Limited, Cambridge (GB)

( * ) Notice: Subject to any disclaimer, the term of this patent is extended or adjusted under 35 U.S.C. 154(b) by 539 days.

(21) Appl. No.: 13/875,704

(22) Filed: May 2, 2013

(65) Prior Publication Data

US 2014/0331028 A1    Nov. 6, 2014

(51) Int. Cl.
*G06F 9/00* (2006.01)
*G06F 9/44* (2006.01)
*G06F 9/34* (2006.01)
*G06F 9/38* (2006.01)
*G06F 9/30* (2006.01)

(52) U.S. Cl.
CPC .......... *G06F 9/3861* (2013.01); *G06F 9/30054* (2013.01); *G06F 9/3806* (2013.01)

(58) Field of Classification Search
None
See application file for complete search history.

(56) References Cited

U.S. PATENT DOCUMENTS

| 5,507,030 A | * | 4/1996 | Sites | .................. G06F 8/30 |
| | | | | 712/E9.028 |
| 5,721,855 A | * | 2/1998 | Hinton | ................ G06F 9/30152 |
| | | | | 711/E12.049 |
| 8,738,860 B1 | * | 5/2014 | Griffin | ................ G06F 12/0897 |
| | | | | 711/122 |
| 2010/0161951 A1 | * | 6/2010 | Chiou | .................. G06F 9/3806 |
| | | | | 712/240 |
| 2014/0317390 A1 | * | 10/2014 | Demongeot | .......... G06F 9/3844 |
| | | | | 712/239 |

OTHER PUBLICATIONS

K. Skadron et al., "Improving Prediction for Procedure Returns with Return-Address Stack Repair Mechanisms", IEEE, 1998, pp. 259-271.
G. Chiu et al., "Mechanism for Return Stack and Branch History Corrections Under Misprediction in Deep Pipeline Design", IEEE, 2008, 8 pages.
V. Desmet et al., "Correct Alignment of a Return-Address-Stack after Call and Return Mispredictions", Dept. of Electronics and Information Systems, Ghent University, Belgium, Department of Computer Science, University of Cyprus, Nicosia, 9 pages.

* cited by examiner

*Primary Examiner* — Michael Sun
(74) *Attorney, Agent, or Firm* — Nixon & Vanderhye P.C.

(57) ABSTRACT

A data processing apparatus and method of data processing are disclosed. A fetch unit retrieves program instructions comprising call instructions and return instructions from memory to be executed by an execution unit. A branch prediction unit generates a return address prediction for an identified return instruction with reference to a return address stack. The branch prediction unit performs a return address push onto said return address stack when the execution unit executes a call instruction and performs a return address pop from the return address stack when the execution unit executes a return instruction. An error detection unit identifies a missing call instruction or a missing return instruction in said program instructions by reference to the return address prediction, a resolved return address indicated by the execution unit when the return instruction is executed and the content of the return address stack.

19 Claims, 5 Drawing Sheets

IDENTIFICATION OF MISSING CALL AND RETURN INSTRUCTIONS FOR MANAGEMENT OF A RETURN ADDRESS STACK

BACKGROUND OF THE INVENTION

1. Field of the Invention

The present invention relates to a data processing apparatus configured to execute call and return instructions, and to generate return address predictions for identified return instructions with reference to a return address stack.

2. Background

It is known for a data processing apparatus to execute program instructions which comprise both call and return instructions, wherein a call instruction causes the data processing apparatus to depart from sequential program instruction execution to execute a further sequence of program instructions until a return instruction is encountered when the data processing apparatus then returns to the original sequential program instruction flow following the call instruction which caused the departure. Such a data processing apparatus may be provided with a branch prediction unit which is configured to generate a return address prediction for an identified return instruction in the sequence of program instructions being executed, such that the data processing apparatus can already begin fetching the expected sequence of program instructions after that return instruction and passing them to the execution pipeline before that return instruction is actually executed, to avoid delays associated with the instruction fetching and pipelining process.

The return address prediction may be generated on the basis of the content of a return address stack which the data processing apparatus maintains for this purpose. A return address is pushed onto the return address stack when a call instruction is executed (this return address typically being the address of the instruction sequentially following the call instruction) and for each return instruction which is executed, a return address is popped from the top of the return address stack. The content of the return address stack, in particular the return address on top of the return address stack, can then be used to provide a prediction of the return address.

This hardware-based mechanism for generating return address predictions is however reliant on the software written for the data processing apparatus adhering to an expected structure, in particular that call and return instructions in the program flow are logically paired. When this is not the case, i.e. when there is a broken call-return flow in the software, the functionality of the return address stack breaks down. Previously this would have been addressed by seeking to improve the software or the compilers.

In the case of a data processing apparatus configured to perform speculative instruction execution, various mechanisms have been implemented to respond to speculation errors, yet these do not address the issue of a broken call-return flow. These are: "Improving Prediction for Procedure Returns with Return-Address-Stack Repair Mechanisms", Skadron, K. and Ahuja, P. S. and Martonosi, M. and Clark, D. W. —Proceedings of the 31st annual ACM/IEEE international symposium on Microarchitecture—1998; "Mechanism for return stack and branch history corrections under misprediction in deep pipeline design", Chiu, G. Y. and Yang, H. C. and Li, W. Y. H. and Chung, C. P. —Computer Systems Architecture Conference, 2008. ACSAC 2008. 13th Asia-Pacific—2008; and "Correct alignment of a return-address-stack after call and return mispredictions", Desmet, V. and Sazeides, Y. and Kourouyiannis, C. and De Bosschere, K. —Workshop on Duplicating, Deconstructing and Debunking—2005.

SUMMARY

Viewed from a first aspect, there is provided a data processing apparatus comprising a fetch unit configured to retrieve program instructions from memory, wherein said program instructions comprise call instructions and return instructions; and an execution unit configured to carry out data processing operations by executing said program instructions, wherein said fetch unit comprises:

a branch prediction unit configured to generate a return address prediction for an identified return instruction in said program instructions with reference to a return address stack, wherein said branch prediction unit is configured to perform a return address push onto said return address stack when said execution unit executes a call instruction and is configured to perform a return address pop from said return address stack when said execution unit executes a return instruction; and an error detection unit configured to identify a missing call instruction in said program instructions, and configured to identify a missing return instruction in said program instructions, by reference to:

said return address prediction;

a resolved return address indicated by said execution unit when said execution unit executes said return instruction; and content of said return address stack.

The inventors of the present invention have realised that it would be advantageous to provide a mechanism for coping with a broken call-return flow in program instructions being executed by a data processing apparatus which uses a return address stack to generate return address predictions for identified return instructions in those program instructions, where that return address stack is non-speculative, i.e. architectural. In particular, by providing a hardware based mechanism for doing this, the complexities typically associated with a software-based repair mechanisms are avoided and the data processing apparatus may be made more resilient to changes resulting from software evolution. For example, whilst a broken call-return flow may result from poorly written software, the present inventors have realised that this may also result from seeking to execute legacy software originally written for an older data processing apparatus. For example, changes in assembler syntax can mean that the call-return flow only breaks once the software is ported to a newer data processing apparatus for which changes in the assembler syntax may mean that although the software generally executes correctly, the return address prediction functionality provided by use of the return address stack may not, and thus the performance of the data processing apparatus when executing this software may suffer. There are indeed various different ways in assembler to code a call and return sequence and the evolution of assembler syntax can mean that some of these ways will not be properly recognised by the return address prediction mechanisms of a newer data processing apparatus. However, the present invention addresses this issue by providing an error detection unit in the data processing apparatus which can identify either a missing call instruction or a missing return instruction in the program instructions by comparison of a return address prediction made for an identified return instruction with the resolved return address when that return instruction is executed and the content of the return address stack.

For example, the error detection unit may be configured to identify the missing return instruction in the program instructions retrieved from the memory when the return address prediction generated by the branch prediction unit is not equal to the resolved return address (i.e. a misprediction has occurred) and the resolved return address is found on top of the return address stack. The fact that the resolved return address has been found on top of the return address stack, whilst the execution of the return instruction has already caused a return address to be popped from the return address stack, indicates that an unpaired call instruction (i.e. one without an associated return instruction) has caused a return address to be pushed on to the return address stack, it being this return address which was popped in this response to the execution of the return instruction, thus leaving the return address corresponding to the return instruction on top of the return address stack.

The error detection unit may be configured to identify the missing call instruction in the program instructions retrieved from the memory when the return address prediction generated by the branch prediction unit is not equal to the resolved return address (i.e. a misprediction has occurred) and the resolved return address is not found on top of the return address stack. When the return address prediction generated by the branch prediction unit is not equal to the resolved return address, the fact that the resolved return address is not found on top of the return address stack is indicative of the fact that the return instruction for which the resolved return address has been indicated did not have an associated call instruction in the sequence of program instructions.

For the event that the error detection unit identifies either a missing call instruction of a missing return instruction in the program instructions, the error detection unit may further comprises an error correction unit configured to perform an error correction procedure in response to identification by said error detection unit of one of said missing call instruction and said missing return instruction in said program instructions.

Various error correction procedures may be envisaged, but in response to identification by the error detection unit of a missing return instruction, the error correction procedure may comprise performing an additional return address pop from the return address stack. Hence, in the situation where the resolved return address has been found on top of the return address stack, correct alignment of the return address stack with respect to the call-return instruction flow may be achieved by popping that return address from the return address stack.

As another error correction procedure, when a missing call instruction is identified by the error detection unit, the error correction procedure may comprise causing a popped return address resulting from the return address pop to be returned to the return address stack. In this situation the absence of a call instruction from the program instructions has meant that a return address corresponding to that call instruction will not have been pushed onto the return address stack, and hence the subsequent execution of an unpaired return address will have meant that a return address has been popped from the return address stack unnecessarily. By causing the return address which was popped to be returned to the return address stack this return address is then correctly in place for when the correct return instruction to which this return address belongs (i.e. with its correctly paired call instruction) is encountered.

The return of the popped return address to the return address stack may take place in a number of different ways. For example, the data processing apparatus may be configured to store a return address which is popped from the return address stack in a storage unit in the fetch unit, and in this case the error detection unit can be configured to return the popped return address to the return address stack from the storage unit in the fetch unit. In another example, the error detection unit may be configured to return the popped return address to the return address stack from the execution unit. For example, in embodiments where the return address is popped from the return address stack when the return address prediction is provided, and the return address prediction passes through the execution pipeline in association with the return instruction, this may provide the source of the popped return address for returning to the return address stack.

The error correction procedure may comprise flushing the return address stack.

Viewed from a second aspect there is provided a data processing apparatus comprising means for retrieving program instructions from memory, wherein said program instructions comprise call instructions and return instructions;

means for carrying out data processing operations by executing said program instructions;

means for performing a return address push onto a return address stack when a call instruction is executed;

means for generating a return address prediction for an identified return instructions identified in said program instructions with reference to a return address stack;

means for performing a return address pop from said return address stack when a return instruction is executed; and means for identifying a missing call instruction in said program instructions, and for identifying a missing return instruction in said program instructions, by reference to:

said return address prediction;

a resolved return address indicated when said means for carrying out data processing operations executes said return instruction; and content of said return address stack.

Viewed from a third aspect, there is provided a method of data processing comprising the steps of:

in a fetch unit retrieving program instructions from memory, wherein said program instructions comprise call instructions and return instructions;

in an execution unit carrying out data processing operations by executing said program instructions;

performing a return address push onto a return address stack when a call instruction is executed;

generating a return address prediction for an identified return instruction in said program instructions with reference to a return address stack;

performing a return address pop from said return address stack when a return instruction is executed; and identifying one of a missing call instruction and a missing return instruction in said program instructions retrieved from said memory by reference to:

said return address prediction;

a resolved return address indicated by said execution unit when said return instruction is executed; and content of said return address stack.

BRIEF DESCRIPTION OF THE DRAWINGS

The present invention will be described further, by way of example only, with reference to embodiments thereof as illustrated in the accompanying drawings, in which.

DESCRIPTION OF THE PREFERRED EMBODIMENTS

Figure 1:
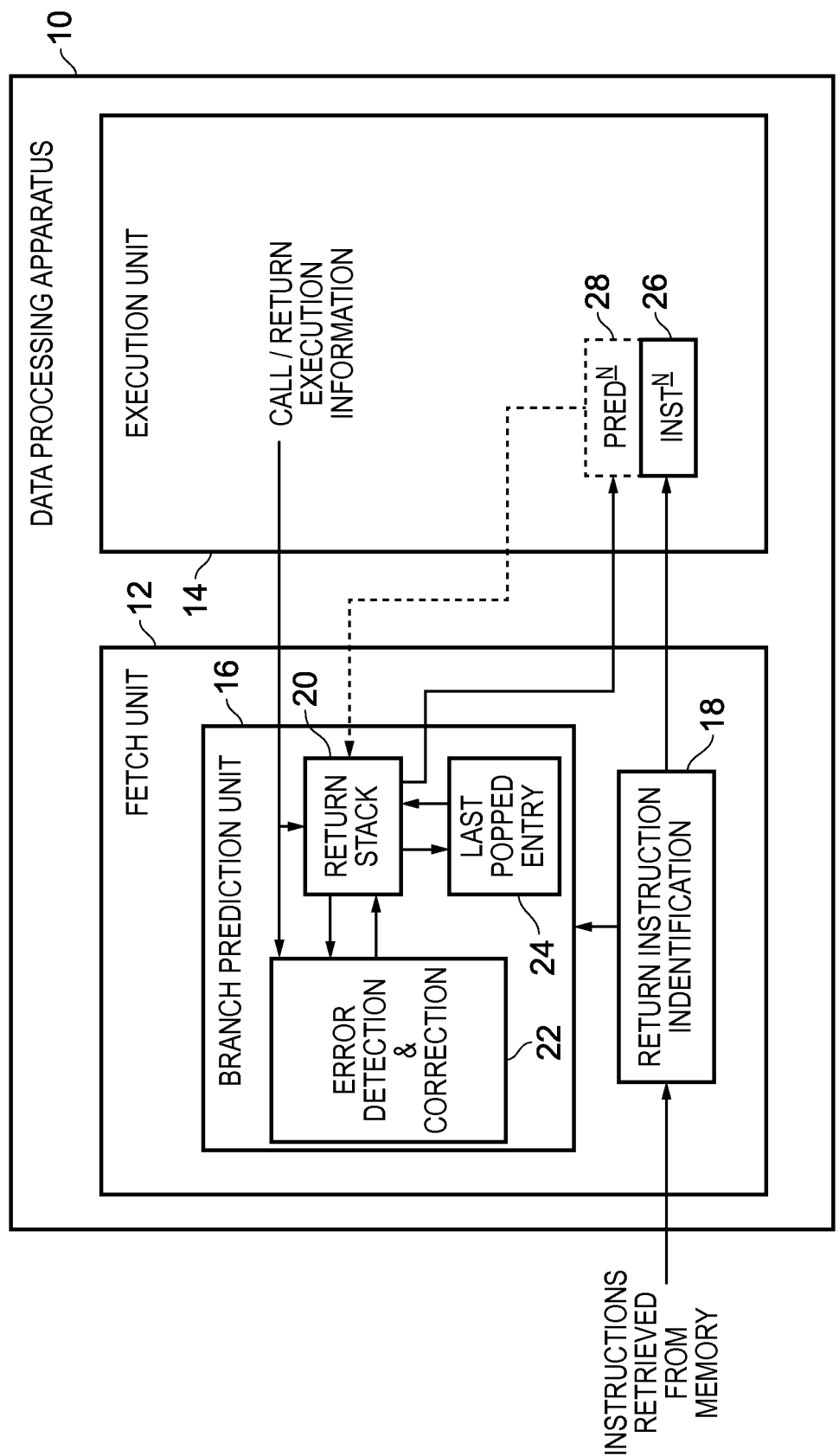
FIG. 1 schematically illustrates a data processing apparatus comprising a fetch unit and an execution unit in one embodiment.

FIG. 1 schematically illustrates a data processing apparatus 10 which comprises a fetch unit 12 and an execution unit 14. The fetch unit 12 is configured to retrieve program instructions from memory (not shown) which are then passed to the execution unit 14 for execution. In order to be able to provide the execution unit 14 with as continuous a sequence of instructions for execution as possible, i.e. without the execution unit 14 having to wait whilst instructions are retrieved from memory, the fetch unit 12 comprises a branch prediction unit 16 configured to make predictions for target addresses of branch instructions (i.e. instructions which cause a change of program flow—a departure from sequential program instruction execution). On the basis of these target address predictions, the fetch unit 12 can continue to retrieve sequential program instructions from memory following that predicted target address, on the basis of the expectation of that branch being taken.

The fetch unit 12 is in particular configured to identify return instructions (by means of return instruction identification unit 18) in the sequence of program instructions being retrieved from memory and passed to execution unit 14. In FIG. 1 return instruction identification unit 18 is schematically illustrated in terms of this particular function, but it will be recognised that this may for example be provided by a branch table such as a branch target buffer or a branch target address cache. In order to generate target address predictions for instructions recognised as return instructions, the branch prediction unit comprises a return stack 20 configured to store return addresses for return instructions. The fetch unit 12, and in particular the branch prediction unit 16, receives call and return execution information from the execution unit 14, and for each architecturally executed call instruction, the corresponding return address is pushed on top of the return stack 20 (here this return address being the address of the instruction which follows the call instruction). For each architecturally executed return instruction indicated by the execution unit 14, the return stack pops the top of the stack. Accordingly, when a sequence of call instructions are encountered, a number of return addresses are correspondingly pushed onto the stack, such that when the corresponding return instructions are later encountered, the branch prediction unit 16 can generate target address predictions on the basis of these return addresses in order to provide the execution unit 14 with a continuous sequence of program instructions for execution. When the corresponding return instructions are executed by the execution unit 14, the corresponding return addresses on the return stack are popped.

Whilst it would normally be expected that call and return instructions would be paired in the encountered program instructions, as mentioned above it has been recognised that this may in fact not always be the case, whether being due to poorly coded software, or perhaps simply due to the evolution of assembler syntax meaning that a call/return intended to be present by the programmer will not be recognised as such by the data processing apparatus. An unpaired call or return instruction will disrupt the usual operation of the return stack 20, and for this reason the branch prediction unit 16 further comprises an error detection and correction unit 22 configured to monitor for the occurrence of such problems and to take appropriate corrective action. In particular, as will be explained in more detail with reference to the examples which follow, the error detection unit 22 is configured to identify such errors on the basis of an identified misprediction by the branch prediction unit (when the target address predicted by the branch prediction unit for a return instruction does not correspond to the resolved return address indicated by the execution unit 14 when that return instruction was executed) and with reference to the content of the return stack 20. Further details of how this happens are described with reference to the figures which follow. However note that branch prediction unit 16 further comprises a last popped entry storage unit 24. This storage unit is configured to store the most recently popped entry from the return stack 20 such that, as part of a correction procedure, it may be returned to the return stack 20 when necessary. As an alternative to this arrangement, note that execution unit 14 in FIG. 1 is schematically shown with instruction 26 and an associated prediction 28. In other words, for an instruction passed to the execution unit 14 which has been identified as a return instruction, it may be accompanied by a target address prediction 28 provided by the return stack 20. As such, as the return instruction progresses through the execution pipeline, it may be accompanied by its target address prediction. This not only facilitates the identification within the execution unit 14 of when a misprediction has occurred (by comparison of this targeted address prediction 28 with the resolved return address resulting from execution of the return instruction) but also in some embodiments this target address prediction 28 may provide the source of a return address which may be returned to the return stack 20 as part of a correction procedure carried out by the error detection and correction unit 22. This will be explained in more detail in the following.

Figure 2:
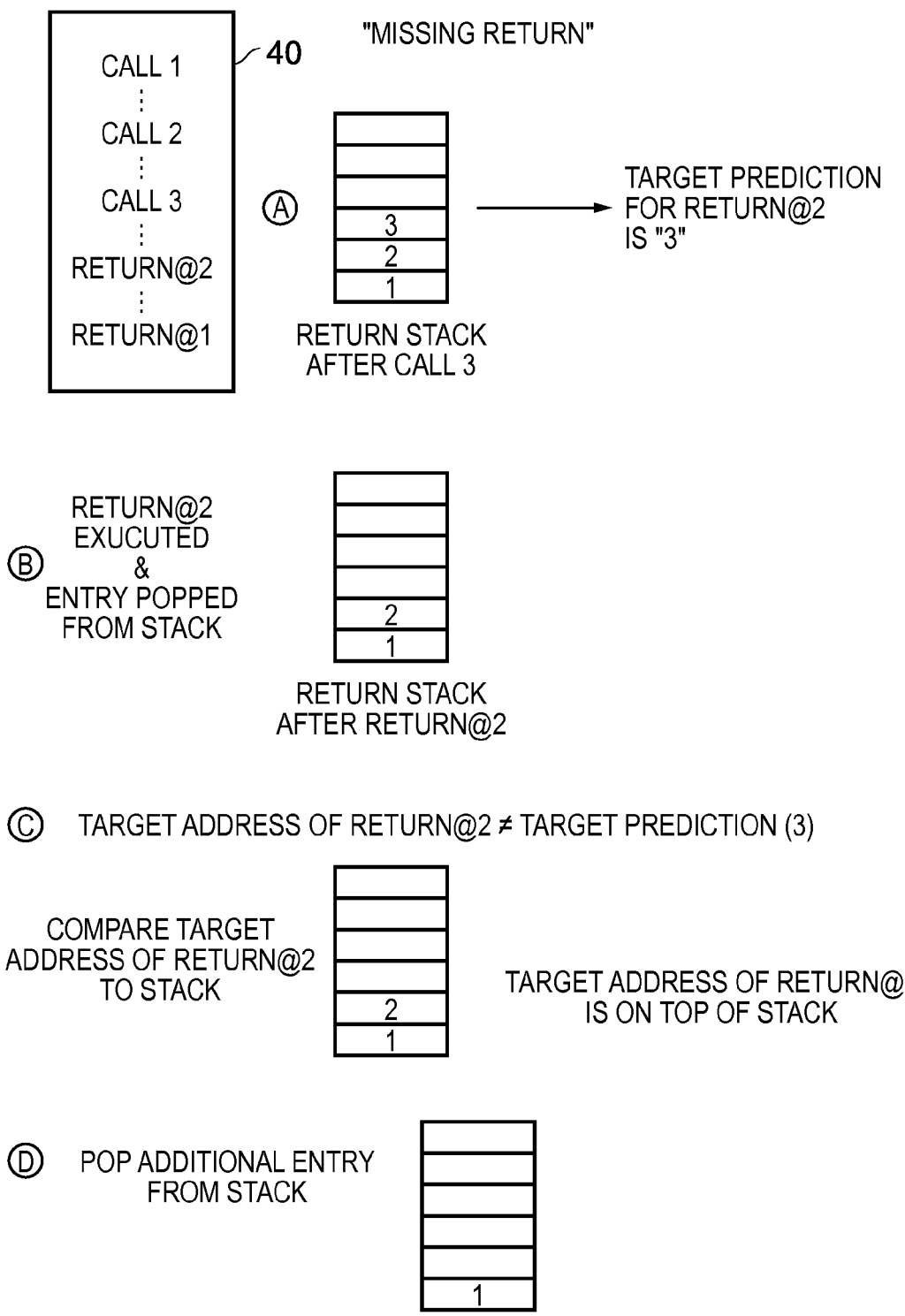
FIG. 2 schematically illustrates the evolution of the content of a return stack in one embodiment when a sequence of program instructions are executed in which a return instruction is missing.

FIG. 2 schematically illustrates the evolution of the content of the return stack 20 when a sequence of program instructions 40 are retrieved from memory by the fetch unit 12 for execution by execution unit 14. In the sequence of program instructions 40, only the call and return instructions are shown and note in particular that whilst the first two call instructions (CALL 1 and CALL 2) have corresponding return instructions (RETURN@1 and RETURN@2), a corresponding return instruction for call instruction CALL 3 is missing. Note that here the notation "RETURN@1" means a RETURN instruction to the instruction following the instruction CALL 1 in the program sequence. Stage "A" illustrates the content of return stack 20 after CALL 3 has been executed, when the execution of the three call instructions has caused respective return addresses to be pushed onto the return stack 20. Then, when RETURN@2 is identified within fetch unit 12, the branch prediction unit 16 refers to the top of return stack 20 to make its target prediction for this return address. Accordingly, the target prediction for RETURN@2 is "3" (i.e. the return address pushed onto the return stack by the execution of instruction CALL 3.

Later, at stage "B", the execution of RETURN@2 causes an entry to be popped from the top of return stack 20 such that following the execution of RETURN@2 the return stack 20 then comprises entries 1 and 2. When RETURN@2 is executed and its return address is resolved, it is identified that this resolved target address (2) is not equal to the target address prediction (3) made by the branch prediction unit 16 for this instruction. Hence at stage "C" the error detection and correction unit 22 then compares the resolved target address of RETURN @2 to the content of the return stack 20 and finds that this target address is currently on top of the stack. This indicates to that a return instruction was missing in the sequence of program instructions 40 and in response, at stage "D", the error detection and correction unit 22 causes an additional entry to the popped from the return stack 20, thus leaving only the single entry "1" remaining in the stack. Subsequently, when RETURN@1 is identified in the fetch unit 12, the branch prediction 16 will be able to correctly predict the target address for this return instruction.

Figure 3:
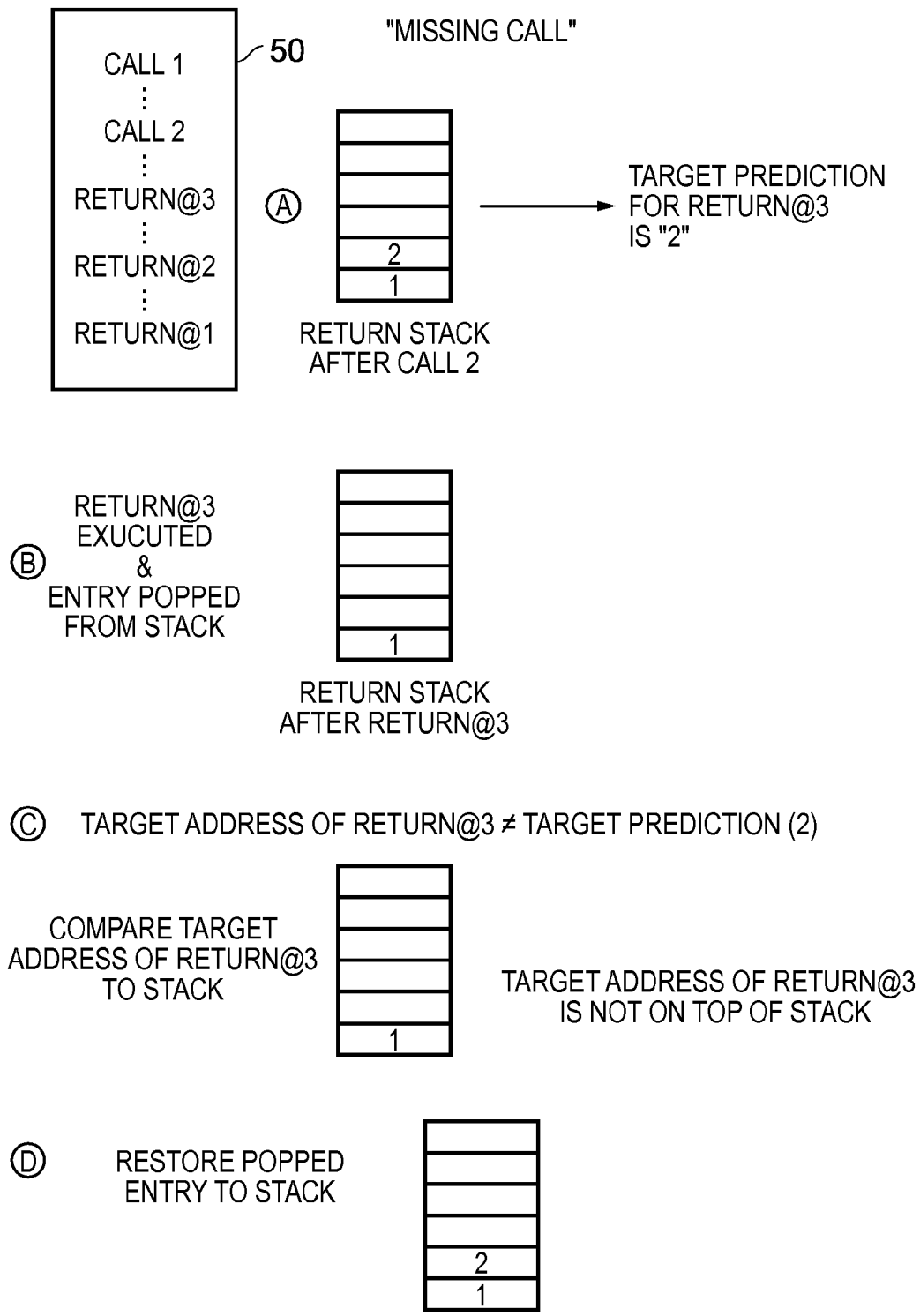
FIG. 3 schematically illustrates the evolution of the content of a return stack in one embodiment when a sequence of instructions are executed in which a call instruction is missing.

FIG. 3 schematically illustrates another example in which a sequence of program instructions 50 are retrieved by the fetch unit 12 for execution by the execution unit 14 in which there is an unpaired return instruction, i.e. there is no corresponding call instruction for the return instruction RETURN@3. Accordingly, in the situation illustrates at stage "A", the return stack 20, following the execution of instruction CALL 2, comprises return addresses pushed onto the return stack for the two call instructions. Then, when the return instruction RETURN@3 is identified in the fetch unit 12, the branch unit 16 refers to the top of the return stack 20 and generates return address 2 as its target address prediction for RETURN@3. Thereafter, at stage "B", when RETURN@3 is executed, an entry is popped from the return stack 20 and thus only the return address 1 remains on the return stack immediately following the execution of RETURN @3. The execution of RETURN@3 also resolves the return address for this return instruction, and the misprediction for this instruction is then identified (stage "C") in that the target return address (3) for this instruction is not the same as the target address prediction (2) made. This causes the error detection and correction unit 22 to compare the resolved target address (3) to the top of the return stack 20, where it is found that the target address of RETURN@3 is not on top of the return stack. This indicates that a call instruction was missing from the sequence of program instructions 50. Then, in response at stage "D", the error detection and correction unit 22 causes the last popped entry from the return stack 20 to be restored. This may for example be performed by returning this entry from the last popped entry unit 24 to the return stack 20. Hence, following stage D, the content of the return stack 20 comprises return addresses 1 and 2, which are then correctly in place to make predictions for the target return addresses when return instructions RETURN@2 and RETURN@1 are encountered by the fetch unit 12.

Figure 4:
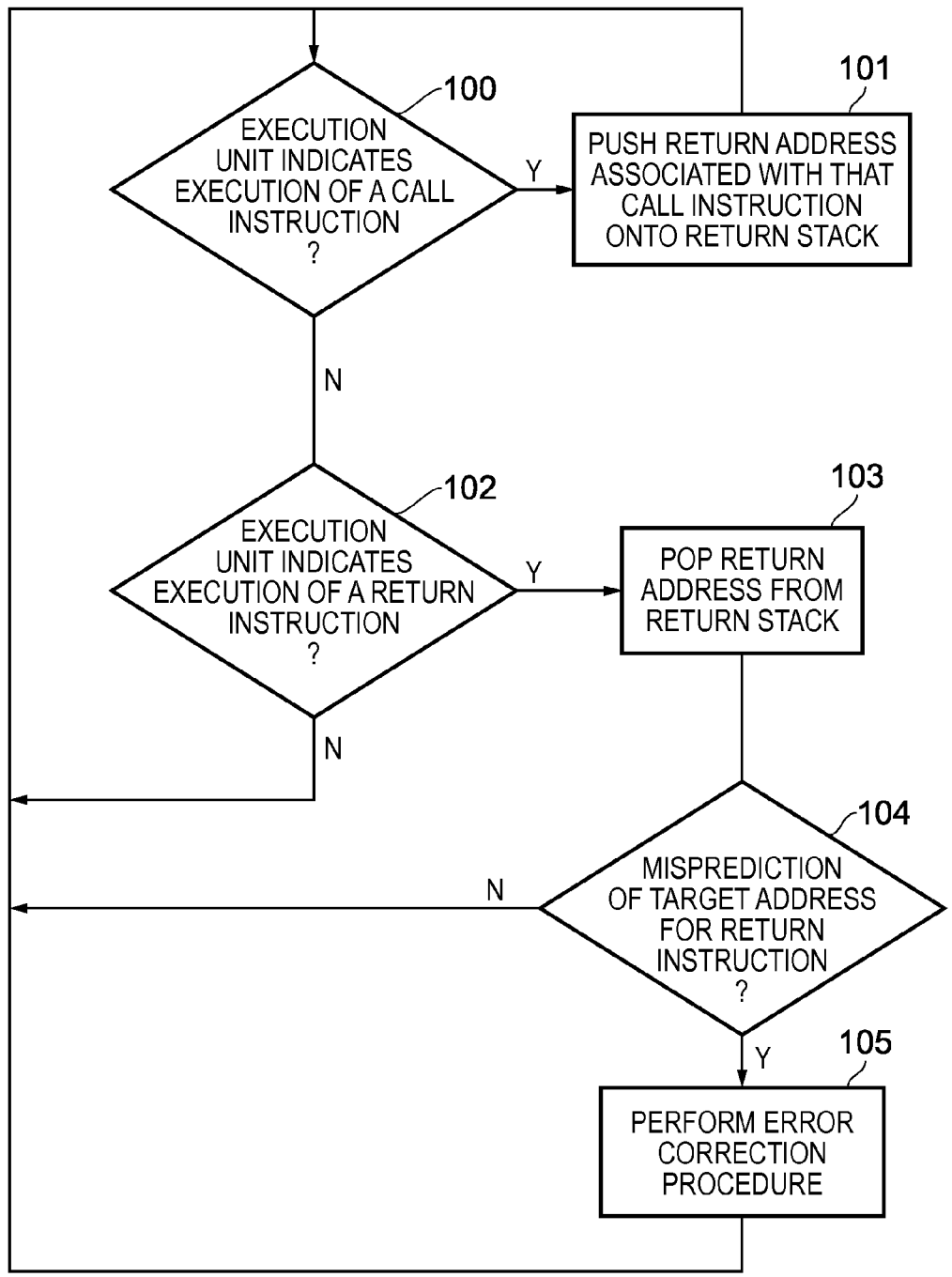
FIG. 4 schematically illustrates a sequence of steps which are taken in one embodiment when a data processing apparatus executes call instructions and return instructions.

FIG. 4 schematically illustrates a sequence of steps which are taken by the data processing apparatus 10 in one embodiment. The flow can be considered to begin at stage 100 where it is determined if the execution unit 100 indicates that execution of a call instruction has taken place. If it has, then the flow proceeds to step 101, where a return address associated with that call instruction is pushed onto the return stack 20 and the flow returns to step 100. If however at step 100 no call instruction execution is indicated by the execution unit, then the flow proceeds to step 102 where it is determined if the execution unit indicates execution of a return instruction. If it does not then the flow simply loops back to step 100 for the on-going process of monitoring for indication of call/return instruction execution by the execution unit 14 to continue. When, at step 102 the execution unit does indicate execution of a return instruction then the flow proceeds to step 103, where a return address is popped from the return stack 20. The flow then proceeds to step 104 where it is determined if there has been a misprediction of the target return address for this return instruction, i.e. if the predicted return address generated with respect to the top of the return stack 20 does not match the resolved return address when this return instruction was executed. If such a misprediction has not occurred, then the flow simply loops back to step 100. If however a misprediction has occurred then the flow proceeds to 105 for an error correction procedure to be carried out. Example error correction procedures have already been described above with reference to FIGS. 2 and 3. In an alternative embodiment however a simple response to identification of misprediction of a target address for return instruction may be to flush the return stack, but this is not preferred because existing content of the return stack, which may still be used for correct target address prediction, is lost.

Figure 5:
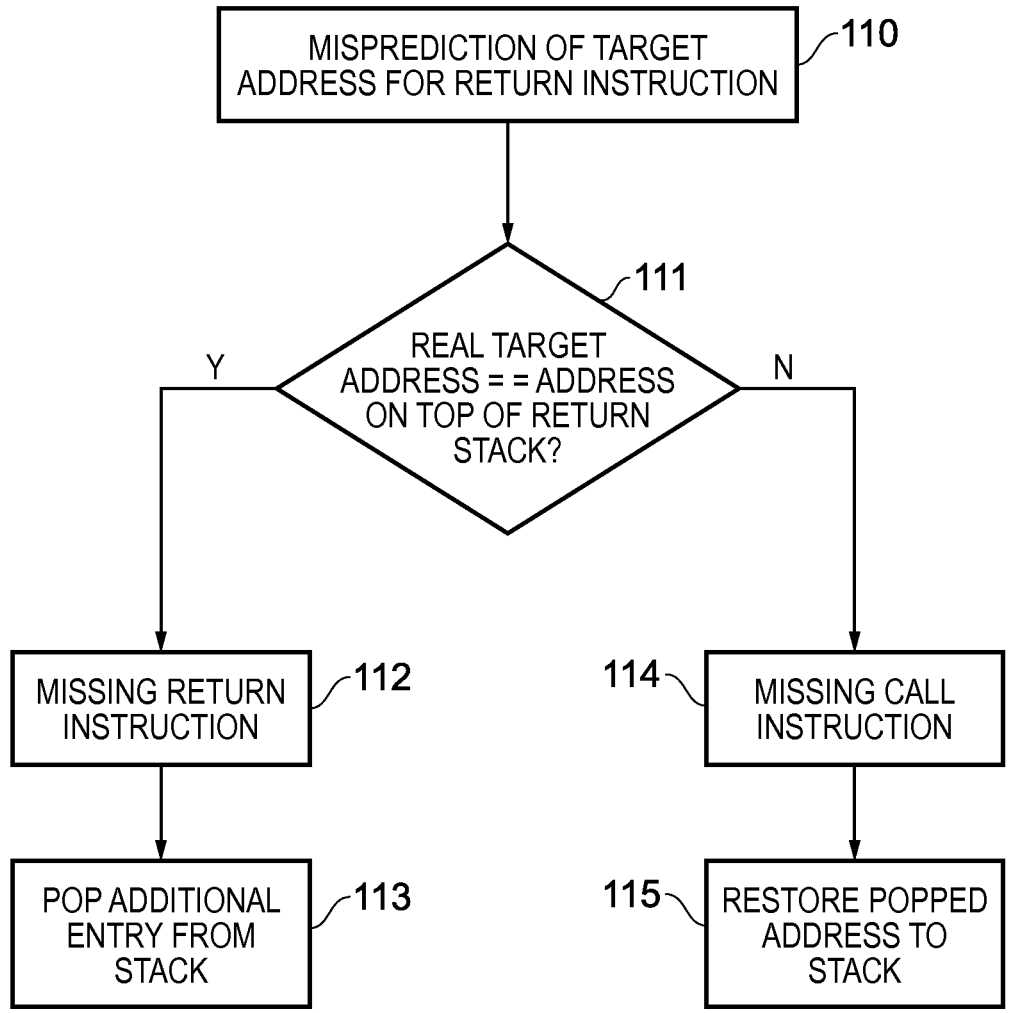
FIG. 5 schematically illustrates a series of steps which are taken in one embodiment when misprediction of a target address for a return instruction occurs.

FIG. 5 schematically illustrates a sequence of steps which may be carried out to perform an error correction procedure such as that mentioned at step 105 of FIG. 4. The illustrated flow begins at step 110 when the misprediction of a target return address for a return instruction is identified. At step 111 it is determined (by the error detection and correction unit 22) if the real target address (i.e. the resolved target address for the executed return instruction) is the same as the address currently on top of the return stack 20. If it is then the flow proceeds to step 112, where the conclusion is drawn that a return instruction is missing from the sequence of instructions encountered by the data processing apparatus 10. This being the case, at step 113 the error detection and correction unit 22 causes an additional entry to be popped from the return stack 20. Conversely, if at step 112 it is found that the real target address does not match the address currently on the top of the return stack 20 then the flow proceeds to step 114 where it is concluded that a call instruction was missing from the sequence of program instructions encountered by the data processing apparatus 10. This being the case then at step 115 the error detection and correction unit 22 causes the last popped entry from the return stack to be restored.

Although particular embodiments of the invention have been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. A data processing apparatus comprising:
   a fetch unit configured to retrieve program instructions from memory, wherein said program instructions comprise call instructions and return instructions; and
   an execution unit configured to carry out data processing operations by executing said program instructions,
   wherein said fetch unit comprises:
   a branch prediction unit configured to generate a return address prediction for an identified return instruction in said program instructions with reference to a return address stack, wherein said branch prediction unit is configured to perform a return address push onto said return address stack when said execution unit executes a call instruction and is configured to perform a return address pop from said return address stack when said execution unit executes a return instruction; and
   an error detection unit configured to identify a missing call instruction in said program instructions, and configured to identify a missing return instruction in said program instructions, by reference to:

said return address prediction;

a resolved return address indicated by said execution unit when said execution unit executes said return instruction; and content of said return address stack.

2. The data processing apparatus as claimed in claim 1, wherein said error detection unit is configured to identify said missing return instruction in said program instructions retrieved from said memory when said return address prediction generated by said branch prediction unit is not equal to said resolved return address and said resolved return address is found on top of said return address stack.

3. The data processing apparatus as claimed in claim 1, wherein said error detection unit is configured to identify said missing call instruction in said program instructions retrieved from said memory when said return address prediction generated by said branch prediction unit is not equal to said resolved return address and said resolved return address is not found on top of said return address stack.

4. The data processing apparatus as claimed in claim 1, wherein said error detection unit further comprises an error correction unit configured to perform an error correction procedure in response to identification by said error detection unit of one of said missing call instruction and said missing return instruction in said program instructions.

5. The data processing apparatus as claimed in claim 4, wherein said error correction procedure, in response to identification by said error detection unit of said missing return instruction, comprises performing an additional return address pop from said return address stack.

6. The data processing apparatus as claimed in claim 4, wherein said error correction procedure, in response to identification by said error detection unit of said missing call instruction, comprises causing a popped return address resulting from said return address pop to be returned to said return address stack.

7. The data processing apparatus as claimed in claim 6, wherein said error detection unit is configured to return said popped return address to said return address stack from a storage unit in said fetch unit.

8. The data processing apparatus as claimed in claim 6, wherein said error detection unit is configured to return said popped return address to said return address stack from said execution unit.

9. The data processing apparatus as claimed in claim 4, wherein said error correction procedure comprises flushing said return address stack.

10. A data processing apparatus comprising:

means for retrieving program instructions from memory, wherein said program instructions comprise call instructions and return instructions;

means for carrying out data processing operations by executing said program instructions;

means for performing a return address push onto a return address stack when a call instruction is executed;

means for generating a return address prediction for an identified return instructions identified in said program instructions with reference to a return address stack;

means for performing a return address pop from said return address stack when a return instruction is executed; and means for identifying a missing call instruction in said program instructions, and for identifying a missing return instruction in said program instructions, by reference to:

said return address prediction;

a resolved return address indicated when said means for carrying out data processing operations executes said return instruction; and content of said return address stack.

11. A method of data processing comprising the steps of:

in a fetch unit retrieving program instructions from memory, wherein said program instructions comprise call instructions and return instructions;

in an execution unit carrying out data processing operations by executing said program instructions;

performing a return address push onto a return address stack when a call instruction is executed;

generating a return address prediction for an identified return instruction in said program instructions with reference to a return address stack;

performing a return address pop from said return address stack when a return instruction is executed; and identifying one of a missing call instruction and a missing return instruction in said program instructions retrieved from said memory by reference to:

said return address prediction;

a resolved return address indicated by said execution unit when said return instruction is executed; and content of said return address stack.

12. The method of data processing as claimed in claim 11, wherein identifying said missing return instruction in said program instructions retrieved from said memory occurs when said return address prediction is not equal to said resolved return address and said resolved return address is found on top of said return address stack.

13. The method of data processing as claimed in claim 11, wherein identifying said missing call instruction in said program instructions retrieved from said memory occurs when said return address prediction is not equal to said resolved return address and said resolved return address is not found on top of said return address stack.

14. The method of data processing as claimed in claim 11, further comprising performing an error correction procedure in response to identification of absence of one of said missing call instruction and said missing return instruction in said program instructions.

15. The method of data processing as claimed in claim 14, wherein said error correction procedure, in response to identification of said missing return instruction, comprises performing an additional return address pop from said return stack.

16. The method of data processing as claimed in claim 14, wherein said error correction procedure, in response to identification of said missing call instruction, comprises causing a popped return address resulting from said return address pop to be returned to said return address stack.

17. The method of data processing as claimed in claim 16, comprising returning said popped return address to said return address stack from a storage unit in said fetch unit.

18. The method of data processing as claimed in claim 16, comprising returning said popped return address to said return address stack from said execution unit.

19. The method of data processing as claimed in claim 14, wherein said error correction procedure comprises flushing said return address stack.

* * * * *